United States Patent
Angerer et al.

(10) Patent No.: US 9,557,976 B2
(45) Date of Patent: *Jan. 31, 2017

(54) ADAPTABLE AND EXTENSIBLE RUNTIME AND SYSTEM FOR HETEROGENEOUS COMPUTER SYSTEMS

(71) Applicant: International Business Machines Corporation, Armonk, NY (US)

(72) Inventors: Christoph M. Angerer, Zurich (CH); Raphael Polig, Dietikon (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/750,994

(22) Filed: Jun. 25, 2015

(65) Prior Publication Data

US 2015/0293751 A1 Oct. 15, 2015

Related U.S. Application Data

(63) Continuation of application No. 14/568,639, filed on Dec. 12, 2014.

(30) Foreign Application Priority Data

Dec. 17, 2013 (GB) .................................. 1322315.1

(51) Int. Cl.
G06F 9/45 (2006.01)
G06F 9/455 (2006.01)
G06F 9/50 (2006.01)

(52) U.S. Cl.
CPC ............ *G06F 8/4441* (2013.01); *G06F 8/433* (2013.01); *G06F 9/4552* (2013.01);
(Continued)

(58) Field of Classification Search
None
See application file for complete search history.

(56) References Cited

U.S. PATENT DOCUMENTS 5,428,786 A * 6/1995 Sites .................... G06F 8/52
717/151
6,389,587 B1 * 5/2002 Lewis ................ G06F 9/4436
717/104

(Continued)

FOREIGN PATENT DOCUMENTS

EP 2090983 A1 8/2009

OTHER PUBLICATIONS

Dummler et al., "SEParAT: scheduling support environment for parallel application task graphs," Cluster Computing (May 2012) 15:223-238, Springer doi: 10.1007/s10586-012-0211-1.

*Primary Examiner* — Chat Do
*Assistant Examiner* — Douglas Slachta
(74) *Attorney, Agent, or Firm* — David M. Quinn; Michael J. Chang, LLC

(57) ABSTRACT

A method for accelerating processing of program code in a heterogeneous system may be provided. It may include identifying at runtime a code region having an acceleration potential, creating a dependency graph of the program code, expanding the dependency graph based on a first set of predefined rules to generate variants of the code region, and determining segments within the variants based on a second set of predefined rules. The segments may be dedicated and assigned and compiled for use to/by a specific execution unit such that a cost function is minimized.

13 Claims, 7 Drawing Sheets

(52) U.S. Cl.
CPC ........... *G06F 9/5066* (2013.01); *Y02B 60/142* (2013.01); *Y02B 60/167* (2013.01)

(56) References Cited

U.S. PATENT DOCUMENTS

| | | | |
|---|---|---|---|
| 7,503,039 B2* | 3/2009 | Inoue | G06F 8/45 717/151 |
| 7,979,852 B2 | 7/2011 | Bodin et al. | |
| 8,296,743 B2* | 10/2012 | Linderman | G06F 9/505 717/140 |
| 8,984,495 B2* | 3/2015 | Guarnieri | G06F 11/3604 717/131 |
| 2005/0268293 A1* | 12/2005 | Kawahito | G06F 8/4434 717/154 |
| 2007/0113223 A1 | 5/2007 | Ludwig et al. | |
| 2007/0174828 A1* | 7/2007 | O'Brien | G06F 8/451 717/151 |
| 2008/0301656 A1* | 12/2008 | Archambault | G06F 8/4441 717/157 |
| 2009/0007087 A1* | 1/2009 | Ito | G06F 11/3604 717/156 |
| 2009/0049433 A1* | 2/2009 | Li | G06F 8/445 717/149 |
| 2009/0055813 A1* | 2/2009 | Haber | G06F 8/4441 717/158 |
| 2010/0199280 A1* | 8/2010 | Vestal | G06F 9/4881 718/102 |
| 2011/0320766 A1* | 12/2011 | Wu | G06F 9/30076 712/28 |
| 2012/0084789 A1 | 4/2012 | Iorio | |
| 2013/0185704 A1* | 7/2013 | Kuesel | G06F 8/443 717/151 |
| 2014/0019949 A1* | 1/2014 | Craymer | G06F 8/443 717/150 |
| 2014/0035922 A1* | 2/2014 | Watt | G06F 11/323 345/440 |
| 2014/0317385 A1* | 10/2014 | Vanderspek | G06F 8/4441 712/216 |

* cited by examiner

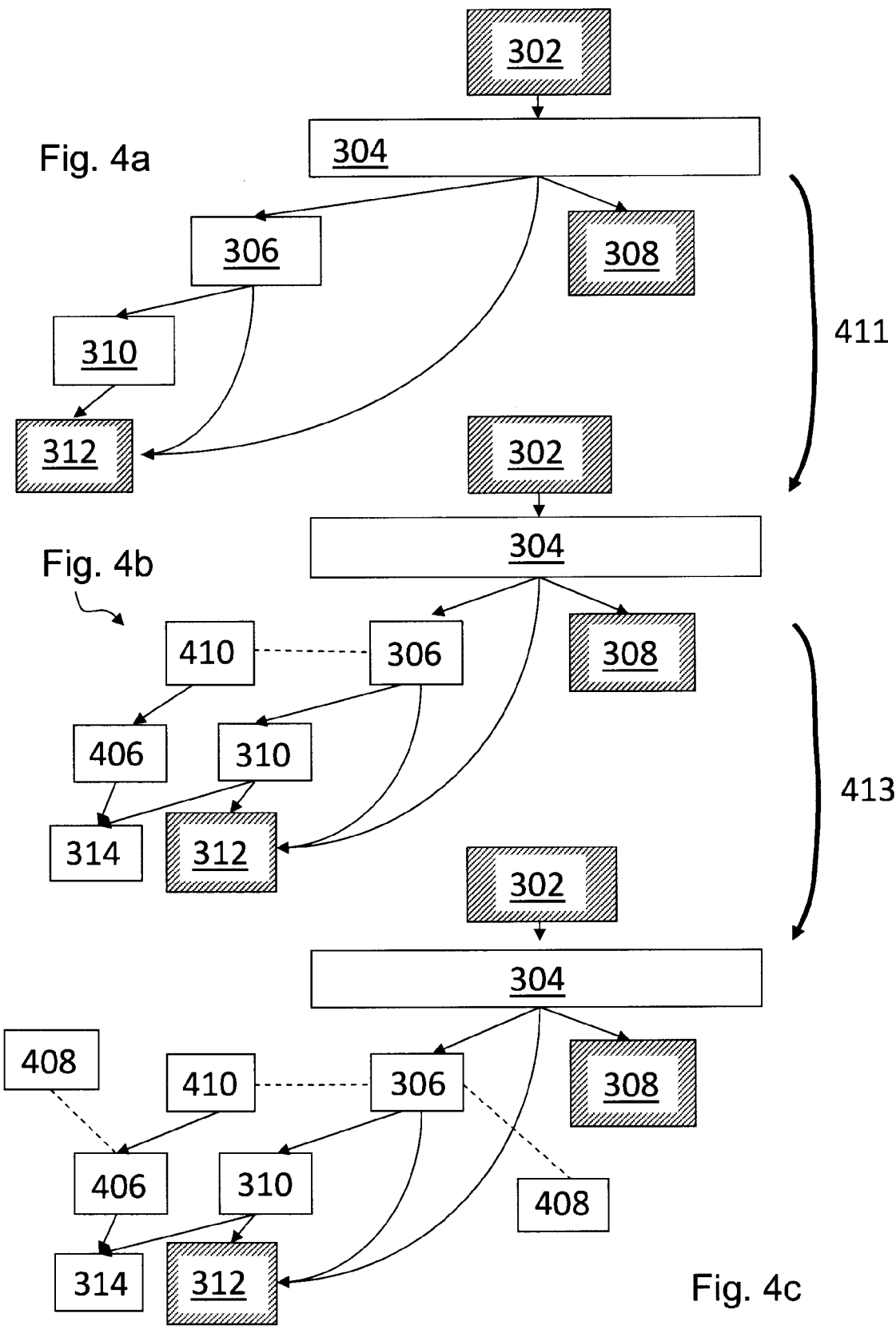

ADAPTABLE AND EXTENSIBLE RUNTIME AND SYSTEM FOR HETEROGENEOUS COMPUTER SYSTEMS

CROSS-REFERENCE TO RELATED APPLICATION(S)

This application is a continuation of U.S. application Ser. No. 14/568,639 filed on Dec. 12, 2014, which claims priority under 35 U.S.C. §119 from United Kingdom Patent Application No. 1322315.1 filed Dec. 17, 2013, the entire contents of both of which are incorporated herein by reference.

FIELD OF THE INVENTION

The invention relates generally to a method for accelerating processing of program code in a heterogeneous system. The invention relates further to a system for accelerating processing of program code in a heterogeneous computing system, a computing system, a data processing program, and a computer program product.

BACKGROUND OF THE INVENTION

Developing a complex computer software application usually requires specific domain knowledge. Domain experts are focusing on the overall functional correctness of an application, but lacking knowledge about system level optimizations such as parallel programming for multi-core CPUs or using graphics processors for matrix calculations. This lack of knowledge may result in a poor performance of the application or even infeasibility, e.g., extreme memory consumption. Today, computer systems are often made up of several different processing units such as CPUs (central processing unit), GPUs graphics processing unit), FPGAs (field programmable gate arrays) and other dedicated processing units. Such systems are referred to as heterogeneous systems. System experts are needed to fully exploit the performance of such a system. These experts know about the best implementation for a given subroutine of an application program such as sorting or matrix multiplication on a specific system. Often, system experts provide libraries containing efficient implementations of subroutines for a specific system. Such libraries may adapt the underlying algorithm (execution kernel) of a subroutine, depending on current input parameters and system settings, to optimize for specific performance goals such as high throughput or low power consumption. For domain experts to develop their software, they are using such system libraries in order to benefit from system level optimizations. The drawback, however, may be the required use of such libraries: not only does this hinder portability to other systems but—even more important—domain experts still need to be specialists in using such relatively low-level libraries and must know how to apply them efficiently to achieve a performance improvement.

Related published technologies include, e.g., U.S. Pat. No. 8,296,743 B2, which discloses a method for library-based compilation and dispatch to spread computations of a program across heterogeneous cores in a processing system. The source program contains a parallel-programming keyword, such as map-reduce, from a high-level library oriented parallel programming language.

U.S. Pat. No. 7,979,852 B2 discloses a system for automatically generating optimized codes which are operational on a predefined hardware platform. The system includes an analyzing device for defining optimization rules on the basis of performance tests and measures determined on the basis of standout sequences and static and dynamic parameters.

Thus, known solutions are able to dynamically change the execution kernel for a single function during runtime to optimize a given program for a new system setting. However, such systems still require the domain expert to use specific libraries appropriately during development. Furthermore, the focus on adapting only single kernel functions prevents the system from applying higher-level optimizations such as re-ordering or merging of kernels.

However, known technologies perform the optimization on the basis of single instructions of a program code. Hence, there is a need for an optimization targeted at a sequence of several instructions which may run in a heterogeneous computing system environment.

SUMMARY OF THE INVENTION

This need may be addressed by a method for accelerating processing of program code in a heterogeneous system and a related system for accelerating processing of program code, a data processing program, and a computer program product, according to the independent claims.

According to an embodiment of one aspect, a method for accelerating processing of program code in a heterogeneous system may be provided. The heterogeneous system may include different execution units. The method may include identifying at runtime of the program code a code region in the program code, wherein the code region may have an acceleration potential which may be determined based on a trigger. The method may further include creating a dependency graph of the program code of the code region, expanding the dependency graph based on a first set of predefined rules, thereby generating variants of the code region, and determining segments within each of the variants of the code region of the expanded dependency graph based on a second set of predefined rules, wherein each segment may be assignable to a specific execution unit.

Furthermore, the method may include selecting segments out of the variants such that a set of selected segments is equivalent to the program code functionality of the code region, and wherein a total cost function for an execution of the selected segments is minimized, compiling the set of selected segments at runtime of the program code, and assigning each segment of the set of selected segments to a respective specific execution unit. Preferably the step of assigning each segment of the set of selected segments to a respective specific execution unit is done/performed such that total computing costs to execute the program code are minimized and/or otherwise optimized.

According to an embodiment of a second aspect, a system for accelerating processing of program code in a heterogeneous computing system including different execution units may be provided. The system may include an identification unit adapted for identifying at runtime of the program code a code region in the program code, wherein the code region has an acceleration potential which may be determined based on a trigger, a graph creation unit adapted for creating a dependency graph of the program code of the code region, and an expanding unit adapted for expanding the dependency graph based on a first set of predefined rules, thereby generating variants of the code region.

Additionally, the system may also include a determination unit adapted for determining segments within each of the variants of the code region based on a second set of predefined rules, wherein each segment may be assignable to a specific execution unit; a selection unit adapted for selecting segments out of the variants such that a set of selected segments may be equivalent to the program code functionality of the code region, and wherein a total cost function for an execution of the selected segments may be minimized; and a compiling unit adapted for compiling the set of selected segments at runtime of the program code.

Moreover, the system may include an assignment unit adapted for assigning each segment of the set of selected segments to a respective specific execution unit. Preferably the assignment unit is adapted for assigning each segment of the set of selected segments to a respective specific execution unit such that total computing costs to execute the program code are minimized and/or otherwise optimized.

It may be noted that accelerating processing may include compiling of the program code as well as an execution of the compiled program code.

DETAILED DESCRIPTION

It may be noted that a cost function may primarily weight total computing time, i.e., the shorter the total computing time, the better it is. Also the time for a first or re-compilation may count to the cost function and its components.

In the context of this description, the following conventions, terms and/or expressions may be used:

The term "program code" may denote a series of computer instructions, e.g., in a high level language such as Java, C, or the like. The high level language may be compiled or transformed to generate an intermediate code or a directly executable machine code.

The term "heterogeneous system" may denote a computing systems having a plurality of execution units, like a central processing unit (CPU), a graphics processing unit (GPU), a field programmable gate array (FPGA), or any other specialized execution units.

The term "execution unit" may denote a core part of a processor. A central component of an execution unit may be an ALU (arithmetic logic unit). Some execution units may be optimized for a serial instruction flow while others may be optimized for a parallel execution of machine instructions, for graphics calculation or matrix operations. Again other execution units may be optimized for selected dedicated instructions sets, like e.g., cryptographic processing.

The term "code region" may denote any consecutive group of instructions of a (larger) program code or software program (see above).

"Acceleration potential" of a code region may denote the characteristic of program code of the code region to be optimized to be accelerated in terms of execution time. The acceleration potential may also be determined at runtime of the program code of the code region.

The term "dependency graph" may denote a "directed acyclic graph" (in short "DAG") data structure having the logical and data dependencies between elements of nodes of the program code of a code region. Dependencies may be identified such that the nodes may be put into relationship in the hierarchical, acyclic data structure. Here, nodes may be code segments, or simply segments of program code of the code region.

"A segment" may denote a consecutive series of program instructions building a logically linked group of program instructions. The segmentation may be chosen based on an optimized execute-ability of the consecutive series of program instructions on a specific execution unit as part of the heterogeneous system. However, a specific sequence of instructions may not be required. A re-ordering may be possible.

A "cost function" may denote a weighted value to assess algorithms in light of, e.g., their compute time use of available resources. The cost function may be adapted to different requirements. One requirement may be "short compute time". Another requirement may be "low power consumption" of the heterogeneous system. Thus, the cost function may have different results based on different priorities for applying the total cost function.

The proposed method for accelerating processing of program code in a heterogeneous system may offer a couple of advantages:

In short, it is possible to optimize program code across a series of instructions, i.e., a code region. Individual portions of the program code may run on different execution units within a heterogeneous computing system. This way, available hardware resources may be utilized to its maximum performance level. On the other side, it may not be required that a programmer of an application program knows any details about the underlying heterogeneous hardware system and its different execution units. The optimization of code regions is transparent to the programmer of an application program.

Because the software runtime environment executing the proposed method may have detailed information about the different execution units available in an actual heterogeneous system, it may be decided dynamically which portion of the code region of the program code may be executed on which execution unit at runtime of the program code. Also a re-ordering of instruction may be performed if the run-time environment determines that based on a cost function better results according to optimization objectives may be achieved.

This reaches clearly beyond a single instruction optimization as known by traditional technology. As mentioned, the sequence of instructions within the code region may be re-ordered. Or, new groups of instructions of the code region may be built in order to avoid data movements between different execution units. This mechanism has proven to be instrumental for accelerating processing of program code. Function calls may be replaced by other function calls which may be more executable and more efficiently on another execution unit. However, the final segmentation and optimization may be performed at runtime. Only then it is determinable which actual configuration of different execution units may be available for the optimization process.

It may also be possible to optimize the usage of the available resource depending on predefined optimization rules, like, e.g., optimal speed or minimal power consumption.

According to one embodiment of the method, a trigger may include one out of the group consisting of a counter for a repetition of the code region, a marker in the program code, execution time of the program code of the code region in comparison to stored execution time data of a comparable code region. The marker in the program code may for example be "@accelerate" indicating that this program function may have comparably high potential to build a segment within the code region to be optimized in terms of execution time by assigning it to an execution unit different to the default central processing unit. The trigger may also be activated if a certain portion of a code region will be executed a number of time, wherein the number exceeds a certain threshold value.

According to a further embodiment of the method, the selection of the segments may be based on parameters of an actual status at runtime of the heterogeneous system. The parameters may include at least one out of the group consisting of the available execution units of the heterogeneous system, the program code and input parameters to the program code. This way the acceleration potential, as well as the resulting acceleration of the execution of the program code, may be totally dynamic and determinable at runtime of the program code, or the code region, respectively.

According to one additional embodiment of the method, only the selected segments may be compiled, or transformed, or better, in particular, re-compiled. Whether a compilation or recompilation may be performed may depend on the way the program code is treated and stored. If it may be stored in a compiled manner, their respective code region may be recompiled. In case the program code is stored in an intermediate format, a first-time compile may be required. Also these decisions may be made at runtime of the program code.

According to an enhanced embodiment of the method, the variants of the code region may generate the same result. The functions, i.e., the segments within the code region may define nodes of the dependency graph. Replacement functions of the functions may represent an alternative node to a given node. This way a tree-like, hierarchical data structure, i.e., a graph may be generated. The dependency graph may include alternatives for executing the program code in the code region by specific execution units of the heterogeneous system which may not be the central processing unit. Decisions about this may be made dynamically at runtime.

In a further enhanced embodiment of the method, the selecting segments may include building groups, in particular so-called tiles of segments. The tiles may include segments which may be optimally executed on a specific execution unit one after the other. This way, no data or variables transport from one execution unit to another execution unit may be required. This may further enhance, i.e., shorten, the execution time of the related program code.

According to an additional embodiment of the method, compiling the set of selected segments may include using execution unit specific compilers. Using execution unit specific compilers may be instrumental for generating optimized code for a dedicated execution unit.

According to one further embodiment of the method, the segments include communication nodes. These communication nodes may be used as a communication pipe to transfer data from one segment group to another segment group. This may guarantee a smooth and defined way of communication between different code portions comprised in different tiles or segment groups.

In one embodiment, the communication nodes may be implemented as one out of the group consisting of buffers, queues, serial buses, and direct memory access. The communication nodes may typically be translated or transformed into function calls of device specific libraries. This way, a correct and time optimized communication between different segments may be achieved.

The discussed total cost function may be a combination of cost functions relating to segments and execution units. Each cost function may either be a binary cost guard based on experience or a true cost function reflecting the current state of the related code segment including related data and data volumes.

Furthermore, embodiments may take the form of a computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

It should also be noted that embodiments of the invention have been described with reference to different subject-matters. In particular, some embodiments have been described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

BRIEF DESCRIPTION OF THE DRAWINGS

Preferred embodiments of the invention will now be described, by way of example only, and with reference to the following drawings:

FIGS. 4a, 4b, 4c show examples of a dependency graph expansion.

DETAILED DESCRIPTION OF EXEMPLARY EMBODIMENTS

In the following, a detailed description of the figures will be given. All instructions in the figures are schematic. Firstly, a block diagram of an embodiment of the inventive method for accelerating processing of program code in a heterogeneous system is given. Afterwards, further embodiments of a related system for accelerating processing of program code in a heterogeneous computing system will be described.

Figure 1:
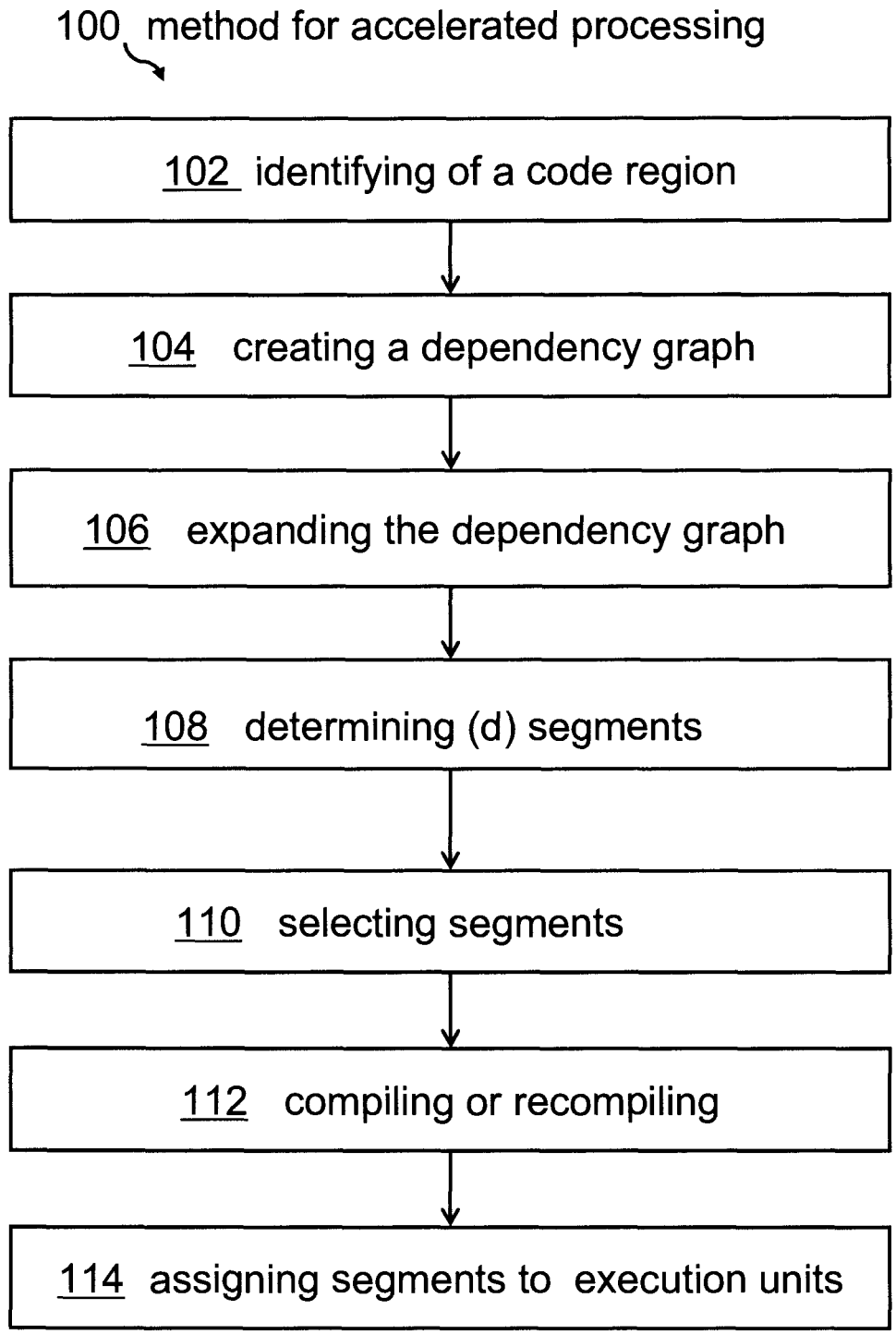
FIG. 1 shows a block diagram of the inventive method for accelerating processing of program code.

FIG. 1 shows a block diagram of the inventive method 100 for accelerating processing of program code. Firstly, a code region may be identified, 102, which may have a certain acceleration potential for a processing of the related program code. It may be understood, that the processing may include not only the execution of the program code but may also include a potential compilation at runtime of the related code portion. However, the compilation of the related code portion may be performed in parallel to an execution of other code portions of the same program. The program code may be available in a high level programming language like, e.g., Java, C, C# ("C sharp"), Python, Ruby or, any other state-of-the-art programming language.

The underlying hardware system 800 (compare FIG. 8) may have a plurality of execution units 802, 803, 805, including at least one central processing unit 802 having one or more execution cores, a dedicated graphics execution unit 805 optimized for parallel processing and/or other dedicated execution units, e.g., in form of a FPGA 803 or the like.

As mentioned above, a code region may be defined as a consecutive series of high level programming language instructions. The mentioned identification may be performed at runtime of the program code. The identification may also rely on a specific trigger. The trigger may have different forms. It may, e.g., be a keyword embedded into a series of high level language instructions within the program code. One possible way to mark such a trigger may be to embed the following line into the construction sequence: "@accelerate". Other triggers may be activated at runtime during the execution of the program code itself. If, e.g., a certain code region may be executed again and again—more often than a threshold value—the trigger may be activated.

Embedding such an identifier for a dedicated function into the program code may be based on the knowledge of the programmer that the following sequence of instructions may be more efficiently executed in a specific processor, e.g., a graphics processing unit 805 instead of the central processing unit 802. The form of the data structure or the data itself may be better computed on such a graphics subsystem. The data may require a high degree of parallel processing, e.g., matrix operations which execution may be slower on the central processing unit 802.

In the next step, a dependency graph 300 of the program code of the code region may be generated, 104. Until here, the complete code region may be the sum of leafs of the dependency graph.

As a next activity, the dependency graph 300 may be expanded, 106, based on a first set of predefined rules, thereby generating variants of the code region. The dependency graph 300 may now include different options for executing the program code, namely variants. After finishing this step, the program code may be executed in a plurality of ways involving different variants 210, 212, 214. It may only be ensured that the complete functionality of the program code of the code region may map to the original program code of the code region.

In a next step, a determination, 108, of segments (e.g., segment 304, 306, 310, 504) may be performed of each of the variants 202, 210, 212, 214 within the code region based on a second set of predefined rules, wherein each segment is assignable to a specific execution unit 802, 803, 805. It may be ensured that the complete functionality and integrity of the code region may be maintained.

Afterwards, segments may be selected, 110, out of the variants such that a set of selected segments may be equivalent to the program code functionality of the complete code region. Thereby, a total cost function for an execution of the set of selected segments may be minimized. This may include an assignment, 114, of different segments to different execution units 802, 803, 805.

If required, a compilation, 112, or recompilation of each element of the set of selected segments may be performed at runtime of the program code. The compilation may be executed in parallel to the normal program execution. A dedicated compilation execution unit may be instrumental for this.

Last but not least, each segment of the set of selected segments may be assigned to a respective specific execution unit 802, 803, 805, such that total computing costs may be minimized or otherwise optimized, as mentioned above. One target of such an optimization may be a shorter execution time or less power consumption and thus, better use of available computing resources.

Figure 2:
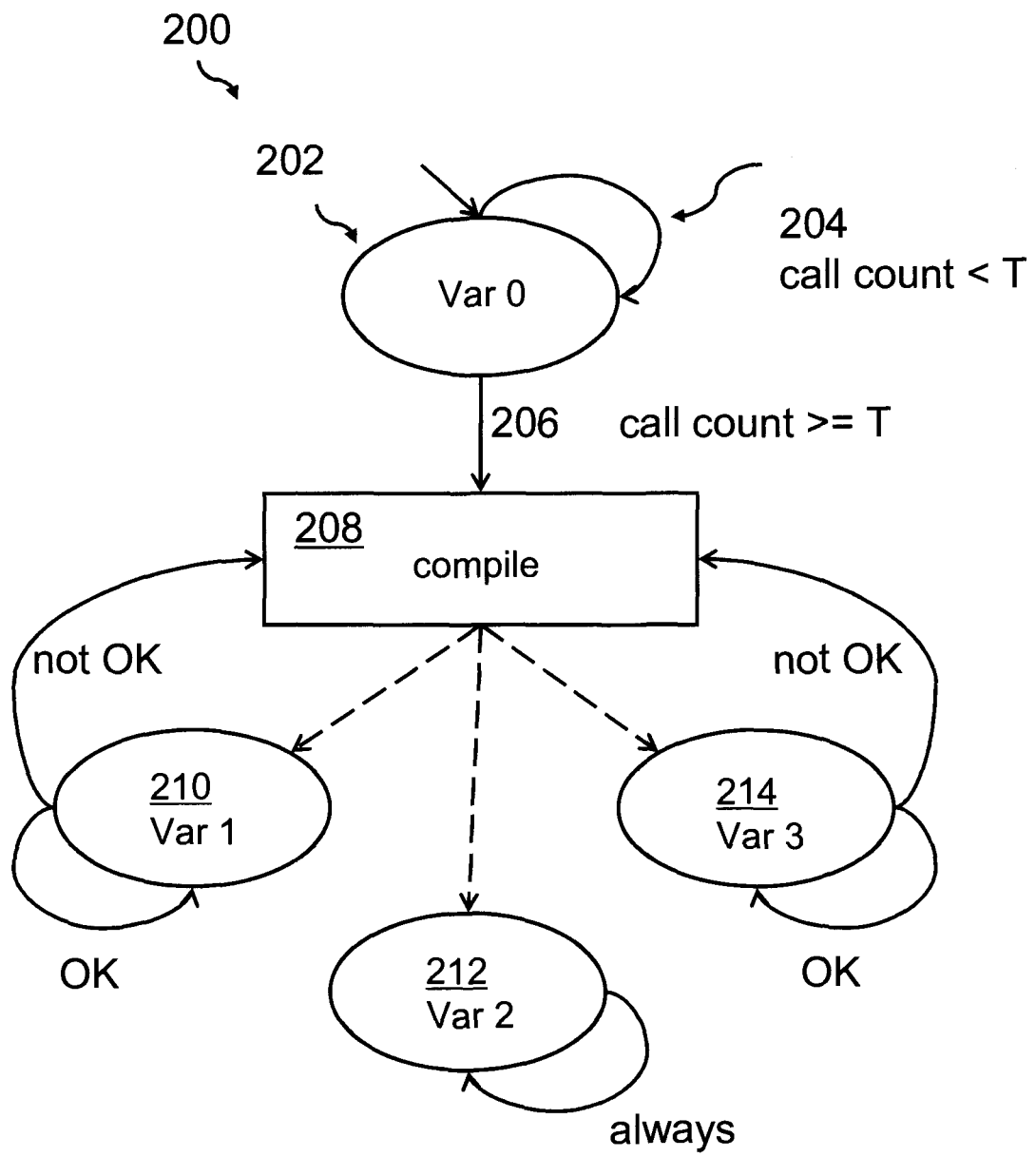
FIG. 2 shows a group of variants of a code region.

FIG. 2 shows a group 200 of variants of a code region. The variant Var0 202 of a portion of the program code of the code region may include the original program code of the portion of the code region. It may be executed several times. The call count may be below a certain threshold T. If the call count may be below this threshold no optimization may occur, 204; Var0, 202 may be executed. In case the call count may be higher than or equal to the predefined threshold T, 206, one of the other variants of the generated source code Var1 210, Var2 212, Var3 214 may be compiled or re-compiled. If a check may determine that a compilation, 208, of the selected variant 210, 212, 214, may not deliver the desired result in terms of expected acceleration of the portion of the program code of the code region, another variant may be compiled and evaluated. The variant Var2 212 is—in this example—the default variant if Var0 202 is not chosen.

Figure 3:
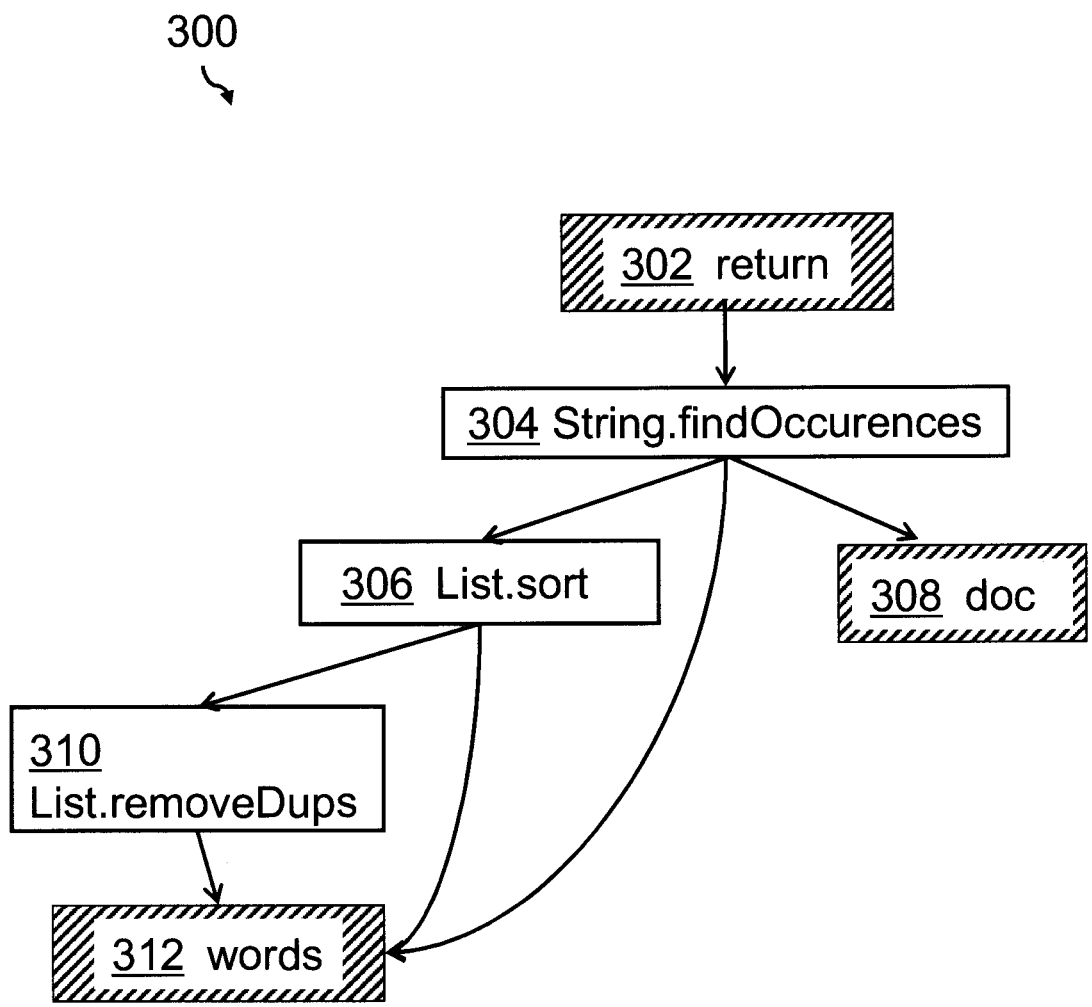
FIG. 3 shows an example of a dependency graph.

FIG. 3 shows an example of a dependency graph 300. Here, a simple example of a functionality of a code region is modeled. In any given text field, duplicates of a certain word shall be eliminated and the remaining list should be sorted. As return value 302, the sorted list without any duplicates may be returned to the calling function. Here, the functions at 304 are called "String.findOccurences". It may include the function "List.sort" 306 as well as the function "List.removeDups" 310. The functions 306 and 310 "work" on the file "doc" 308 and the intermediate storage called "words" 312. To a skilled person it may be clear that an execution may be faster if the list may be sorted first before the duplicates may be removed. Therefore, such a code region including these two functions may have an acceleration potential which may be realized by reversing the executed functions.

FIGS. 4a, 4b and 4c show an example of an expansion of the dependency graph. FIG. 4a represents the same dependency graph as discussed in the context of FIG. 3. This may represent the original program code of the code region.

FIG. 4b shows an additional function "List.removeDups" 410 connected to a function "List.Sort" 406. As can be seen, the sorting and the removing portion of the code region have been reversed. This reversed function call may represent a variant of the original code region. Therefore, block 306 and block 410 are linked via a dashed line. Reference numeral 411 indicates the process of expanding the dependency graph by variants. As a mathematical function, the rule of reversing the functions may be expressed as $$\text{sort}(\text{removeDups}(l)) \rightarrow \text{removeDups}(\text{sort}(l)),$$

wherein "l" may represent the underlying list of words. For completeness reasons, box 314 may be mentioned. This may be a pointer to a generally used memory (not shown in FIG. 4a).

In the next step—illustrated in FIG. 4c—by adding box 408 (mergesort) another variant of the code region may be generated. Box 408 may again be linked via a dashed line illustrating the fact that box 408 may represent an alternative to block 406. In this example, box 408 may represent a specific kind of sorting, namely a "mergesort" executable on an available FPGA 803 of the heterogeneous underlying computing system 800. The same box 408 may be linked via a dashed line to the "List.sort" function of box 306. Thus, this may represent another variant of the code region. As a mathematical function, the rule of replacing one kind of function by another may be expressed as $$\text{List.sort}_{CPU} \rightarrow \text{mergesort}_{FPGA}.$$

Instead of executing the sort function 306 or 406 on the central processing unit (CPU) 802 the rule suggests that the CPU 802 related sorting algorithm may be replaced by another sorting algorithm, namely "mergesort" executable on an FPGA 803 which may be part of the heterogeneous computing system 800. This may also be expressed by the arrow 413. This new assignment may be performed dynamically at runtime.

Some of the rules for expanded the dependency graph 300 of a given code region may exist and may represent the above-mentioned first set of rules.

Figure 5A:
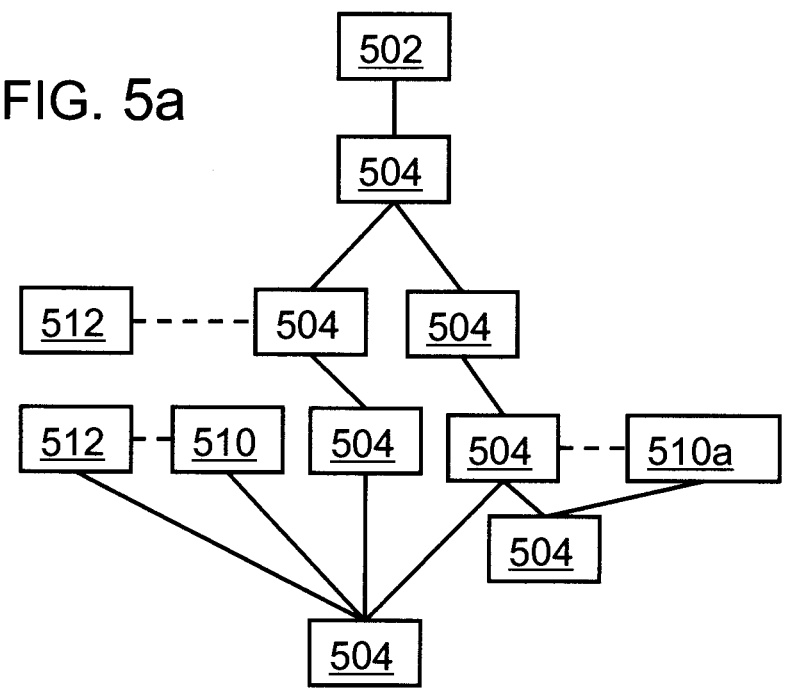
FIGS. 5a, 5b, 5c shows an example of a grouping of segments.
Figure 5B:
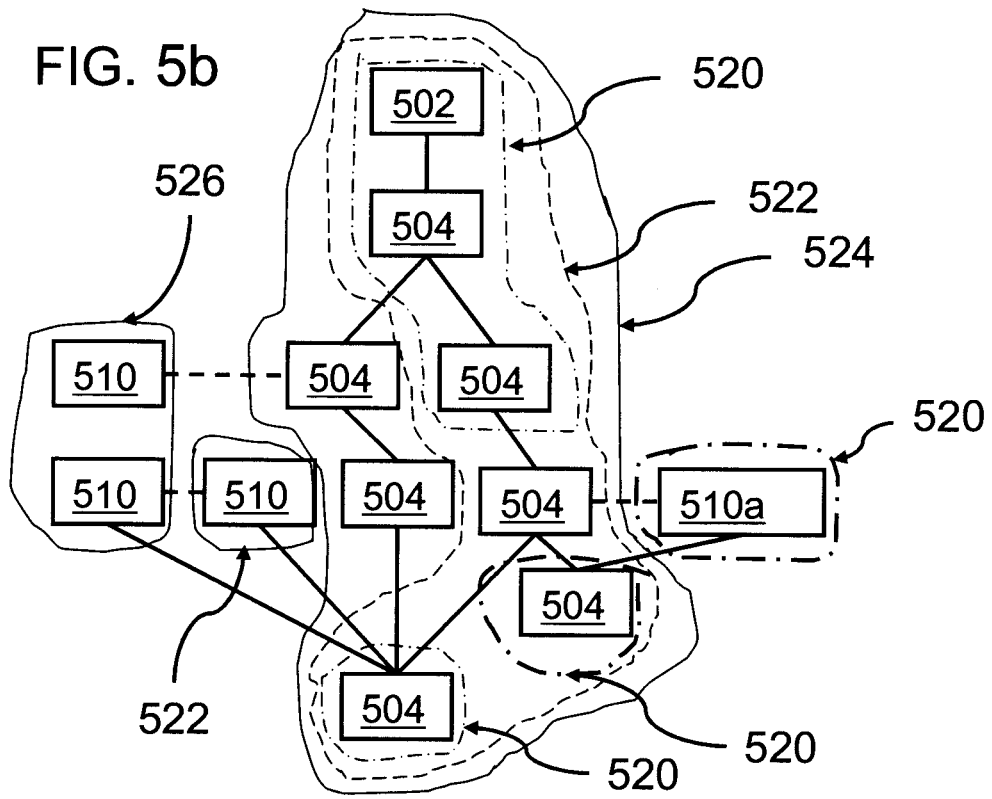
Figure 5C:
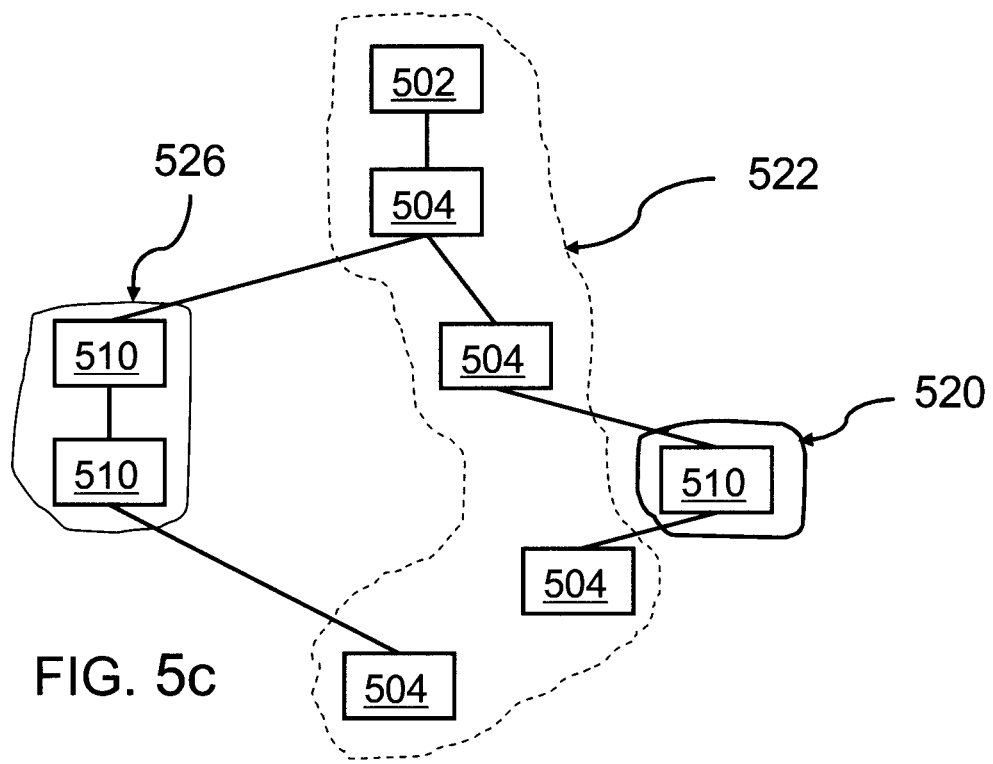

FIGS. 5a, 5b, 5c show an example of a process of a grouping of segments. FIG. 5a may represent a similar expanded dependency graph 300, as discussed in the context of FIGS. 4a, 4b, 4c. The functional content of each of the boxes or segments 502, 504, 510, 512 may be mapped similarly if compared to the boxes in the FIGS. 4a, 4b, 4c. The attention in FIG. 5b may be drawn to the grouping of segments of the expanded dependency graph (compare FIG. 4c). Several groups 520, 522, 524 and 526 of segments have been built. Each group includes a plurality of segments. Some equivalent segments may be shown in different groups 520, 522, 524 and 526. This may express that a specific functionality may be executed within different execution units 802, 803, 805. Thus, each group 520, 522, 524 and 526 may be related to a specific execution unit 802, 803, 805 of the heterogeneous computing system 800, e.g., group 526 may be related to the FPGA 803. One element of group 520 may include only one segment 510a which may be linked to a box 504 in group 524. Both boxes are linked via a dashed line showing that these functional boxes may have a comparable functionality, but may be executable on different execution units 802, 803, 805.

Group 524 may be related to the CPU 802. Group 524 may also include several variants being executable by the CPU 802. However, it is clearly not necessary to execute alternative code portions for the same functionality. Therefore, a selection of segments may be made based on the grouping of functionalities representing the complete functionality of the program code of the code region. Such a selection may be based on a total cost function which may be a combination of cost functions of the individual ones per segment combined with cost functions for compiling or recompiling individual segments in order to replace a related Var0, as discussed above. Overall, the execution time for the code region may be minimized.

In the current example, it may be determined that a combination of the segments of group 522 in combination with the segments of group 520 and group 526 may build in sum the functionality of the related code region. This combination may also have the lowest total cost function. Thus, it may be selected as a set of segments.

As a result, the program code of the code region which may—by default—have been executed completely on the CPU 802 in form of the variant Var0, may now be executed on the FPGA 803, namely, group 526, on the CPU 802, namely, group 520, as well as on the graphics processing unit 805, namely, group 520. A recompile of the dedicated segments for the different execution units 802, 803, 805 may be based on execution unit specific compilers which may guarantee their respective highest performance of each program code segment. The process of grouping different segments may also be described as tiling or building tiles 520, 522, 526 out of a plurality of segments. Such a grouping may be based on a second set of rules. The second set of rules may be instrumental in finding a combination of segments providing a minimal total cost function. One rule may define that a tile switch may happen as seldom as possible. However, a final decision may be made based on the total cost function.

FIG. 5c shows a final grouping or tiling of segments and its assignment to different execution units 802, 803, 805. Group 526 may be assigned to the FPGA 803, group 522 may be assigned to the CPU 802 and group 520 may be assigned to a graphic processing unit 805. The grouping and assignment may be based on cost functions including all additional workload including a potentially required new compiling of the segment(s).

Figure 6:
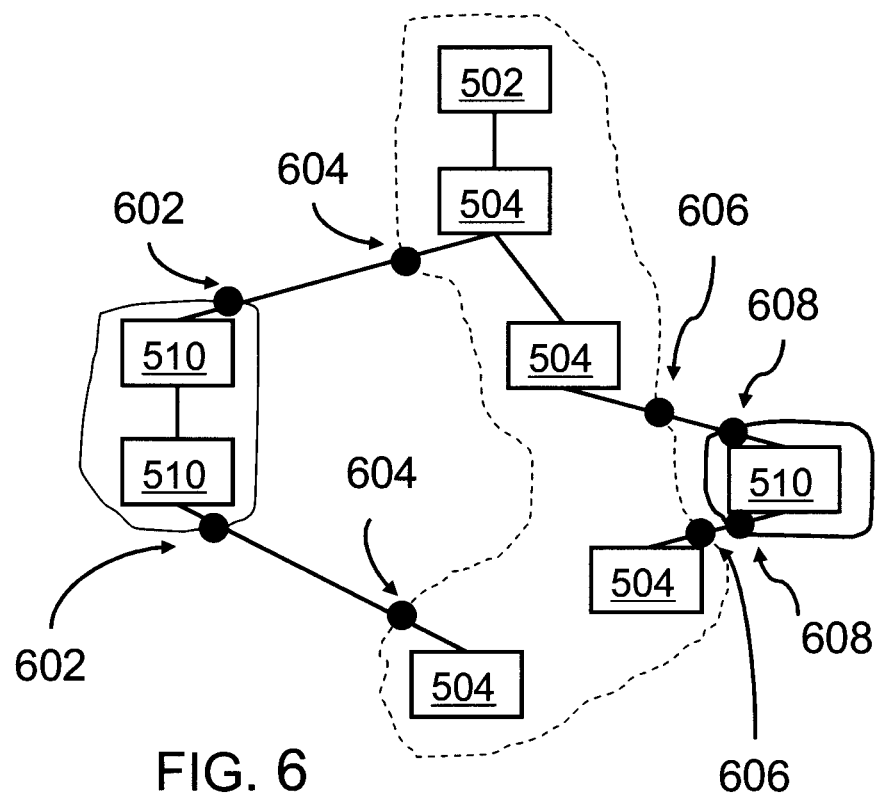
FIG. 6 shows an embodiment with communication nodes between different groups of segments.

FIG. 6 shows the same segments and the same grouping of segments of the code region. However, additionally, there are communication nodes 602, 604, 606, 608 shown between the groups. Communication nodes represent a communication mechanism between different execution units.

Typical execution-unit-to-execution-unit communication techniques include buffers, queues, serial buses and/or direct memory access. Generally, the communication nodes may be realized using execution specific libraries for an optimized data exchange. Within a group, a specific communication based on nodes may not be required because here the data may be available in the execution units 802, 803, 805 anyway. They may be exchanged based on a register-to-register-communication.

Figure 7:
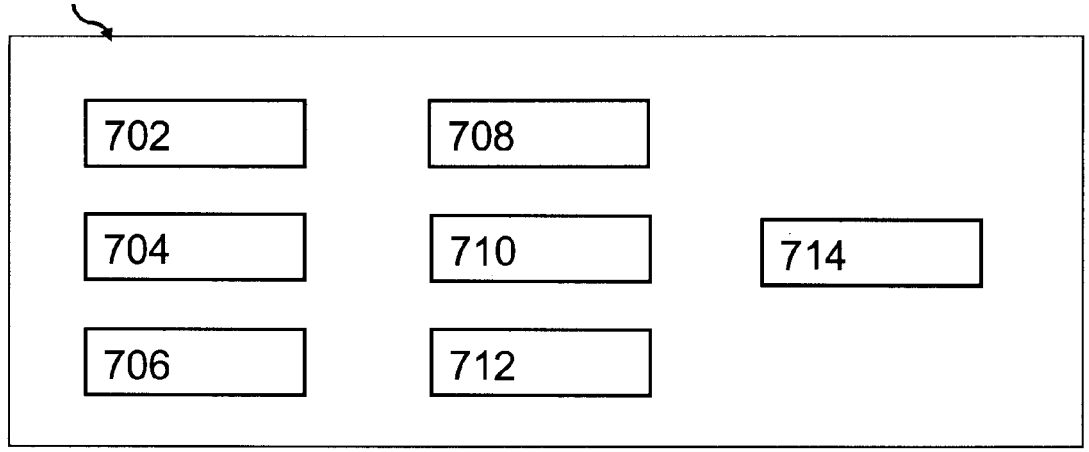
FIG. 7 shows a system for an accelerated processing of program code.

FIG. 7 shows a system 700 for an accelerated processing of program code.

According to an exemplary embodiment, system 700 is adapted for accelerating processing of program code in a heterogeneous computing system including different execution units. The system 700 may include an identification unit 702 adapted for identifying at runtime of the program code a code region in the program code, wherein the code region has an acceleration potential which may be determined based on a trigger; a graph creation unit 704 adapted for creating a dependency graph of the program code of the code region; and an expanding unit 706 adapted for expanding the dependency graph based on a first set of predefined rules, thereby generating variants of the code region.

Additionally, the system 700 may also include a determination unit 708 adapted for determining segments within each of the variants of the code region based on a second set of predefined rules, wherein each segment may be assignable to a specific execution unit; a selection unit 710 adapted for selecting segments out of the variants such that a set of selected segments may be equivalent to the program code functionality of the code region, and wherein a total cost function for an execution of the selected segments may be minimized; and a compiling unit 712 adapted for compiling the set of selected segments at runtime of the program code.

Moreover, the system 700 may include an assignment (or assigning) unit 714 adapted for assigning each segment of the set of selected segments to a respective specific execution unit. Preferably the assignment unit 714 is adapted for assigning each segment of the set of selected segments to a respective specific execution unit such that total computing costs to execute the program code are minimized and/or otherwise optimized.

Figure 8:
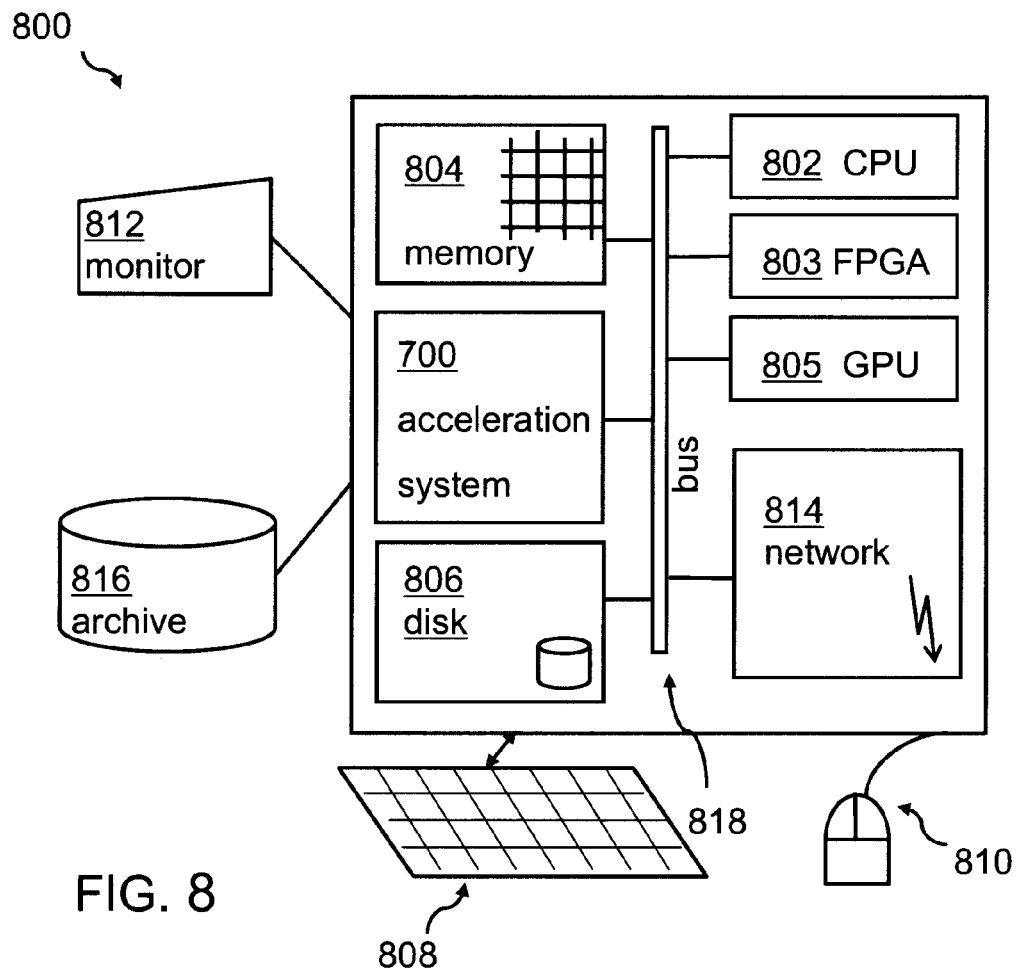
FIG. 8 shows an embodiment of a computer system comprising the system for an accelerated processing of program code.

Embodiments of the invention may be implemented together with virtually any type of computer, regardless of the platform being suitable for storing and/or executing program code. For example, as shown in FIG. 8, a computing system 800 may include one or more processor(s), like the execution unit or CPU 802 with one or more cores per processor, associated memory elements 804, an internal storage device 806 (e.g., a hard disk, an optical drive, such as a compact disk drive or digital video disk (DVD) drive, a flash memory stick, a solid-state disk, etc.), and numerous other elements and functionalities, typical of today's computers (not shown). The memory elements 804 may include a main memory, e.g., a random access memory (RAM), employed during actual execution of the program code, and a cache memory, which may provide temporary storage of at least some program code and/or data in order to reduce the number of times, code and/or data must be retrieved from a long-term storage medium or external bulk storage 816 for an execution. Elements inside the computer 800 may be linked together by means of a bus system 818 with corresponding adapters. Additionally, the computer 800 may include further execution units, like the FGPA 803 and/or the graphics processing unit 805 (GPU), for accelerating processing of program code in the computer system or heterogeneous computing system 800. Furthermore, the system for accelerating processing of program code or—in short—the acceleration system 700 may be coupled to the bus system 818. Other types of execution units may be possible.

The computing system 800 may also include input means, such as a keyboard 808, a pointing device such as a mouse 810, or a microphone (not shown). Alternatively, the computing system may be equipped with a touch sensitive screen as main input device. Furthermore, the computer 800, may include output means, such as a monitor or screen 812 [e.g., a liquid crystal display (LCD), a plasma display, a light emitting diode display (LED), or cathode ray tube (CRT) monitor]. The computer system 800 may be connected to a network (e.g., a local area network (LAN), a wide area network (WAN), such as the Internet or any other similar type of network, including wireless networks via a network interface connection 814. This may allow a coupling to other computer systems or a storage network or a tape drive. Those, skilled in the art will appreciate that many different types of computer systems exist, and the aforementioned input and output means may take other forms. Generally speaking, the computer system 800 may include at least the minimal processing, input and/or output means, necessary to practice embodiments of the invention.

While the invention has been described with respect to a limited number of embodiments, those skilled in the art, having benefit of this disclosure, will appreciate that other embodiments may be devised, which do not depart from the scope of the invention, as disclosed herein. Accordingly, the scope of the invention should be limited only by the attached claims. Also, elements described in association with different embodiments may be combined. It should also be noted that reference signs in the claims should not be construed as limiting elements.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that may communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions, which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus provide processes for implementing the functions/acts specified in the flowchart and/or block diagram block or blocks.

The block diagrams in the Figures illustrate the architecture, functionality, and operation of possible implementations of systems, methods and computer program products according to various embodiments of the present disclosure. In this regard, each block in the block diagrams may represent a module, segment, or portion of code, which comprises one or more executable instructions for implementing the specified logical function(s). It should also be noted that, in some alternative implementations, the functions discussed hereinabove may occur out of the disclosed order. For example, two functions taught in succession may, in fact, be executed substantially concurrently, or the functions may sometimes be executed in the reverse order, depending upon the functionality involved. It will also be noted that each block of the block diagrams, and combinations of blocks in the block diagrams, may be implemented by special purpose hardware-based systems that perform the specified functions or acts, or combinations of special purpose hardware and computer instructions.

The terminology used herein is for the purpose of describing particular embodiments only and is not intended to limit of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiment was chosen and described in order to best explain the principles of the invention and the practical application, and to enable others of ordinary skills in the art to understand the invention for various embodiments with various modifications, as are suited to the particular use contemplated.

The invention claimed is:

1. A method for accelerating processing of program code in a heterogeneous system comprising different execution units, the method comprising:
    identifying at runtime of the program code a code region in the program code, wherein the code region has an acceleration potential which is determined based on a trigger;
    creating a dependency graph of the program code of the code region;
    expanding the dependency graph based on a first set of predefined rules, thereby generating variants of the code region, wherein at least one of the variants of the code region is generated by reversing select functions within the code region to create an expanded dependency graph that includes i) an original code of the code region and ii) a variation of the code region having dependencies of the select functions reversed, and wherein the original code of the code region and the variation of the code region are linked within the expanded dependency graph;
    determining segments within each of the variants of the code region within the expanded dependency graph based on a second set of predefined rules, wherein each of the segments is assignable to a specific one of the execution units;
    selecting the segments out of the variants such that a set of selected segments is equivalent to a program code functionality of the code region, and wherein a total cost function for an execution of the set of selected segments is minimized;
    compiling the set of selected segments at runtime of the program code; and
    assigning each segment of the set of selected segments to a respective specific one of the execution units.

2. The method according to claim 1, wherein the trigger comprises one out of the group consisting of: a counter for a repetition of the code region, a marker in the program code, and execution time of the program code of the code region in comparison to stored execution time data of a comparable code region.

3. The method according to claim 1, wherein only the set of selected segments are compiled.

4. The method according to claim 1, wherein the variants of the code region generate a same result, and wherein the functions within the code region define nodes of the dependency graph, and wherein replacement functions of the functions represent an alternative node to a given node.

5. The method according to claim 1, wherein the selecting the segments comprises building groups of segments.

6. The method according to claim 1, wherein the compiling the set of selected segments comprises using execution unit specific compilers.

7. The method according to claim 1, wherein the total cost function is a combination of cost functions relating to the segments and the execution units.

8. The method according to claim 1, wherein at least one of the variants of the code region is generated by replacing one of the functions within the code region with another function which, at runtime, is assigned to a different one of the execution units.

9. The method according to claim 1, further comprising:
determining whether the variants accelerate the program code by compiling the variants and then evaluating whether the compiled variants accelerate the program code.

10. The method according to claim 1, wherein the selecting the segments is based on parameters of an actual status at runtime of the heterogeneous system.

11. The method according to claim 10, wherein the parameters comprise at least one out of the group consisting of: the execution units of the heterogeneous system available, the program code, and input parameters to the program code.

12. The method according to claim 1, wherein the segments comprise communication nodes.

13. The method according to claim 12, wherein the communication nodes are implemented using one out of the group consisting of: buffers, queues, serial buses, and direct memory access.

* * * * *